(12) United States Patent
Watanabe et al.

(10) Patent No.: US 11,198,464 B2
(45) Date of Patent: Dec. 14, 2021

(54) STEERING SYSTEM

(71) Applicant: JTEKT CORPORATION, Osaka (JP)

(72) Inventors: Takeshi Watanabe, Kashihara (JP); Yasuyuki Nozawa, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/929,385

(22) Filed: Jul. 15, 2020

(65) Prior Publication Data

US 2021/0031823 A1 Feb. 4, 2021

(30) Foreign Application Priority Data

Jul. 29, 2019 (JP) .............................. JP2019-138975

(51) Int. Cl.
*B62D 1/183* (2006.01)
*B62D 1/181* (2006.01)

(52) U.S. Cl.
CPC .............. *B62D 1/183* (2013.01); *B62D 1/181* (2013.01)

(58) Field of Classification Search
CPC .......... B62D 1/181; B62D 1/183; B62D 1/10; B62D 1/18; B62D 1/19
See application file for complete search history.

(56) References Cited

U.S. PATENT DOCUMENTS

| 5,419,215 | A  | * | 5/1995 | Herron ................... | B62D 1/181 280/775 |
| 8,862,331 | B2 | * | 10/2014 | Tanaka ................... | B62D 1/181 701/44 |
| 9,764,756 | B2 | * | 9/2017 | Sugioka .................. | B60N 2/06 |
| 2014/0260761 | A1 | * | 9/2014 | Soderlind .............. | B62D 1/183 74/493 |

(Continued)

FOREIGN PATENT DOCUMENTS

| EP | 3042825 A1 | 7/2016 |
| FR | 2861657 A1 | 5/2005 |
| FR | 3064239 A1 | 9/2018 |

OTHER PUBLICATIONS

Machine language translation of FR3064239A1, obtained from worldwide.espacenet.com/ on May 20, 2021 (Year: 2021).*

(Continued)

*Primary Examiner* — Paul N Dickson
*Assistant Examiner* — Caitlin Anne Miller
(74) *Attorney, Agent, or Firm* — Oliff PLC

(57) ABSTRACT

A steering system includes an operation member; a first movement mechanism configured to move the operation member between a normal position and a storage area located forward of the normal position; a second movement mechanism configured to move the operation member so as to change a position of the operation member in an up-down direction of the vehicle; and a control unit configured to control the first and second movement mechanisms. The (Continued)

storage area is located inward of an opening of a vehicle member provided in front of a driver's seat in the vehicle. The control unit is configured to control, in a case where the operation member is retracted into the storage area, the first movement mechanism and the second movement mechanism to perform a forward movement of moving the operation member that has reached a vicinity of the vehicle member, along an outer shape of the vehicle member.

17 Claims, 6 Drawing Sheets

(56) References Cited

U.S. PATENT DOCUMENTS

| | | | | |
|---|---|---|---|---|
| 2016/0362126 | A1 | 12/2016 | Lubischer et al. | |
| 2017/0297606 | A1* | 10/2017 | Kim | B62D 1/181 |
| 2019/0118852 | A1* | 4/2019 | Suzuki | B60T 7/042 |
| 2019/0291772 | A1* | 9/2019 | Kreutz | B62D 1/10 |
| 2019/0308655 | A1* | 10/2019 | Ochi | B62D 1/181 |
| 2020/0101998 | A1* | 4/2020 | Nishimura | B62D 1/183 |
| 2020/0339179 | A1* | 10/2020 | Nozawa | B62D 1/181 |
| 2021/0031822 | A1* | 2/2021 | Watanabe | B62D 1/181 |

OTHER PUBLICATIONS

Dec. 17, 2020 Search Report issued in European Patent Application No. 20187405.4.

* cited by examiner

STEERING SYSTEM

CROSS-REFERENCE TO RELATED APPLICATION

This application claims priority to Japanese Patent Application No. 2019-138975 filed on Jul. 29, 2019, incorporated herein by reference in its entirety.

BACKGROUND

1. Technical Field

The disclosure relates to a steering system capable of expanding a space in front of a driver by moving an operation member such as a steering wheel.

2. Description of Related Art

In an autonomous driving level 3 or higher, a system is responsible for autonomous driving of a vehicle, and thus, a driver is not responsible for operation of the vehicle and the driver does not need to hold the steering wheel. When the steering wheel is allowed to move in autonomous driving to secure a wide space in front of the driver, the comfort of the driver can be enhanced. For example, US 2016-0362126 A discloses a steering column that retracts a steering wheel to a position before an instrument panel. With the steering column, in the event of an emergency such as a collision of the vehicle, the steering wheel is returned to a normal position to allow the energy absorption mechanism to operate.

SUMMARY

When the steering wheel is moved between the normal position that is a position in which the steering wheel is operated by the driver and a predetermined storage area as in the steering column in the related art, interference between the driver and the steering wheel needs to be considered. For example, when the steering wheel is retracted to a position before a dashboard, a driver's finger or the like may be caught between the steering wheel and the dashboard.

That is, in a steering system having a mechanism capable of moving the steering wheel such that the steering wheel is deployed and retracted, an issue lies in how to move the steering wheel to improve the comfort of the driver and to ensure the safety of the driver at the same time. For example, it is preferable that the steering wheel should move linearly to immediately expand the space in front of the driver. However, this may cause an increase in the possibility of interference between the steering wheel and the driver. In the case where the posture of the steering wheel or the position of the steering wheel in an up-down direction is changed when the steering wheel is retracted into the storage area, it is not easy to determine the manner in which the steering wheel having a three-dimensional structure should behave when the steering wheel is moved into the storage area.

The disclosure was made by the inventors of the present application with a new focus on the issue described above. The disclosure provides a steering system capable of expanding the space in front of the driver and improving the safety of the driver.

An aspect of the disclosure relates to a steering system configured to steer a vehicle. The steering system includes an operation member configured to perform an operation; a first movement mechanism configured to move the operation member between a normal position at which the operation member is operated by a driver, and a storage area located forward of the normal position; a second movement mechanism configured to move the operation member so as to change a position of the operation member in an up-down direction of the vehicle; and a control unit configured to control the first movement mechanism and the second movement mechanism. The storage area is located inward of an opening of a vehicle member provided in front of a driver's seat in the vehicle. The control unit is configured to control, in a case where the operation member is retracted into the storage area, the first movement mechanism and the second movement mechanism to perform a forward movement of moving the operation member that has reached a vicinity of the vehicle member, along an outer shape of the vehicle member.

According to the above-mentioned aspect of the disclosure, it is possible to provide a steering system capable of expanding the space in front of the driver and improving the safety of the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the steering system according to an embodiment of the disclosure and modifications thereof will be specifically described with reference to the drawings. It should be noted that each of the embodiment and the modifications described below illustrates an example. Numerical values, shapes, materials, constituent elements, arrangement positions and connection modes of the constituent elements, steps and the order of the steps, and the like shown in the following embodiment and modifications are merely examples, and do not limit the disclosure.

It should be also noted that the drawings are schematic, in which emphasis, omission, and scale adjustment are made as appropriate to illustrate the disclosure, and may differ from actual shapes, positional relationships, and scales. Further, in the following embodiment, expressions indicating relative directions or postures such as parallel and orthogonal may be used. Note that these expressions include cases in which the directions or postures do not indicate the exact directions or postures. For example, the phrase "two directions are parallel" means that the two directions are completely parallel, and also includes the case in which the two directions are substantially parallel, and for example, a difference of about several percentages is included.

Figure 1:
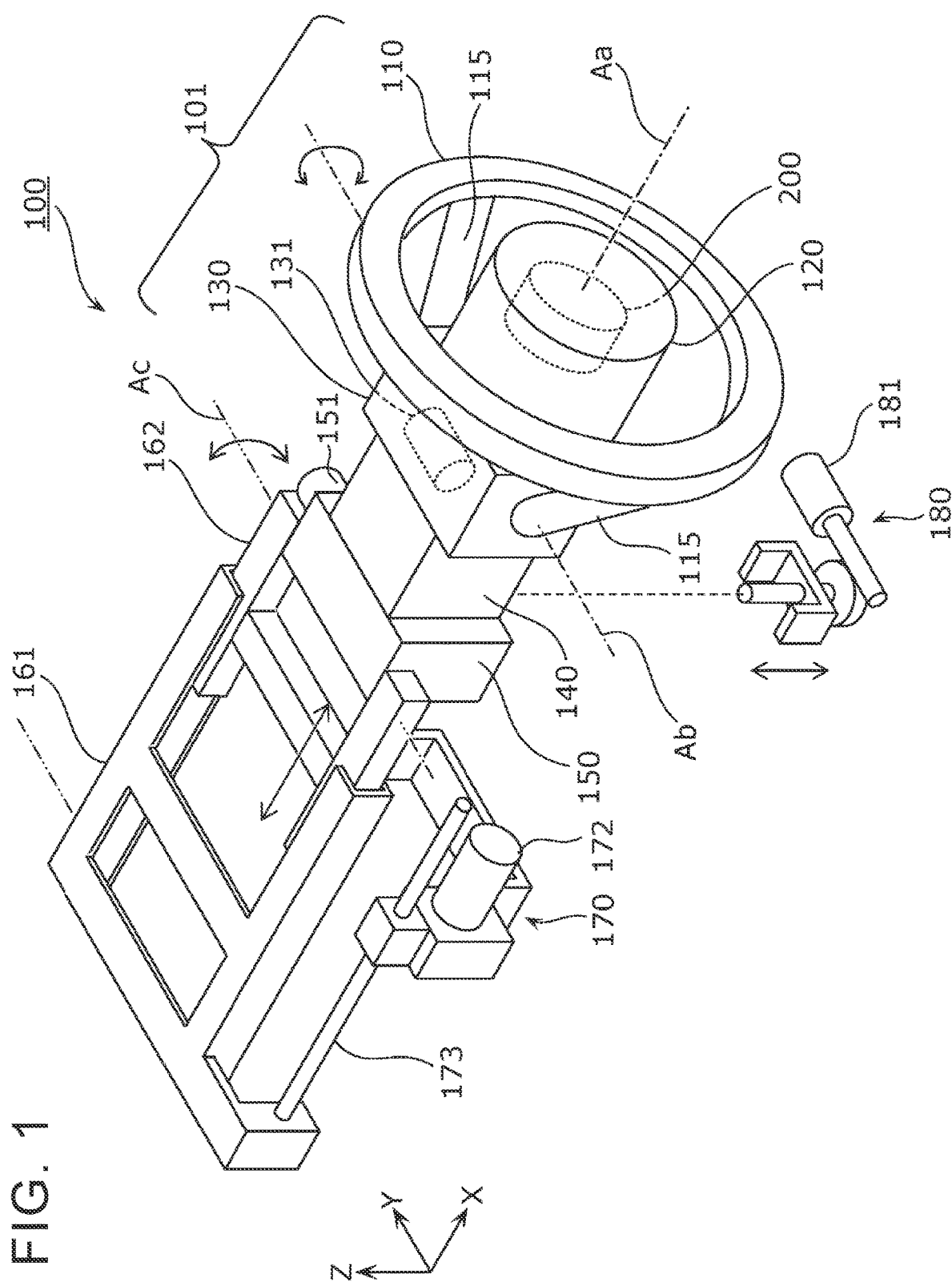
FIG. 1 is a perspective view showing an appearance of a steering system according to an embodiment.
Figure 2:
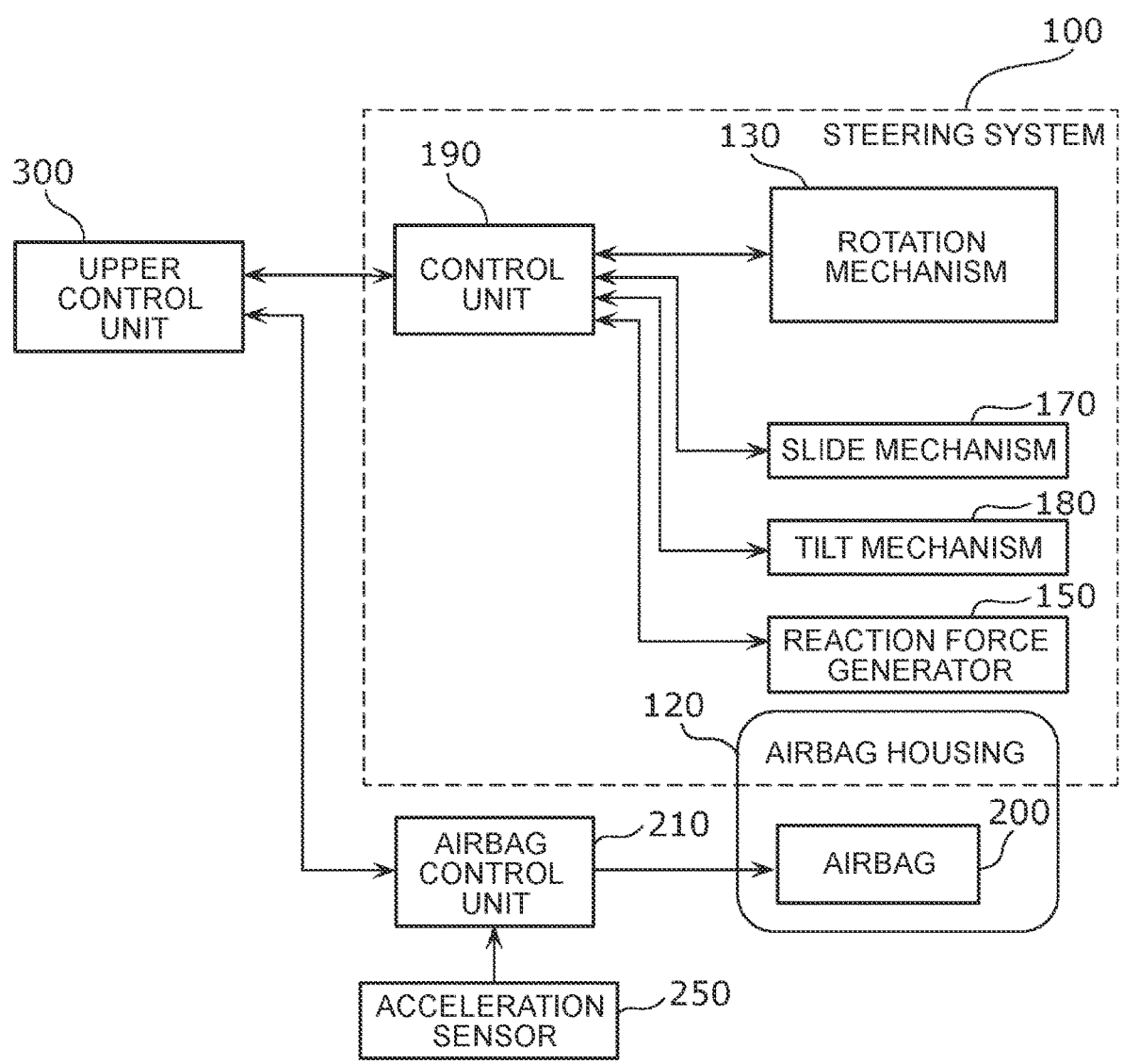
FIG. 2 is a block diagram showing a functional configuration of the steering system according to the embodiment.

A steering system according to an embodiment will be described. FIG. 1 is a perspective view showing an appearance of a steering system 100 according to the embodiment. FIG. 2 is a block diagram showing a functional configuration of the steering system 100 according to the embodiment.

The steering system 100 according to the embodiment is a system mounted on a vehicle such as an automobile, a bus, a truck, a construction machine, or an agricultural machine that can switch between manual driving and autonomous driving, for example.

As shown in FIG. 1, the steering system 100 includes an operation member 110, support members 115 that support the operation member 110, an airbag housing 120, and a rotation mechanism 130. In the embodiment, the operation member 110 is, for example, an annular member called a steering wheel. More specifically, the operation member 110 is a member corresponding to a rim of the steering wheel, and the support members 115 are members corresponding to spokes of the steering wheel.

The operation member 110 rotates around a steering axis Aa (a virtual axis extending in a front-rear direction of the vehicle and parallel to an X-axis direction in the embodiment) due to a driver's operation. One or more tires of the vehicle are steered based on a rotation amount of the operation member 110, and so on. Specifically, the steering system 100 is a device integrated in a so-called steer-by-wire system, and the operation member 110 and the tires are not mechanically connected. A motor for steering operation drives the one or more tires based on information output from the steering system 100 and indicating a steering angle of the operation member 110, and so on.

For example, in a neutral state in which steered wheels are in a straight running state, the operation member 110 is supported by the support members 115 respectively extending from both sides of the rotation mechanism 130 in a width direction of the vehicle (a Y-axis direction in the embodiment), and the rotation mechanism 130 rotates around the steering axis Aa as the operation member 110 rotates around the steering axis Aa. In the embodiment, the airbag housing 120 is fixed to a portion of the rotation mechanism 130, which is located on a driver side (on a plus side in the X-axis direction). When the operation member 110 is viewed from the driver side, the airbag housing 120 is located at the center of the operation member 110. An airbag 200 is accommodated in the airbag housing 120 so as to be deployable. The airbag 200 pushes the airbag housing 120 and breaks through the airbag housing 120 to be deployed when a vehicle collides, for example. Specifically, the airbag 200 operates in accordance with an instruction from an airbag control unit 210 (see FIG. 2) mounted on the vehicle. The airbag control unit 210 instructs the airbag 200 to deploy, for example, when the vehicle collides with an object. The airbag control unit 210 determines whether to deploy the airbag 200 based on, for example, vehicle acceleration information received from an acceleration sensor 250. For example, when the vehicle collides with an object, causing a rapid change in acceleration that is equal to or larger than a threshold, the airbag control unit 210 instructs the airbag 200 to deploy, and the airbag 200 activates an inflator so as to deploy. Thus, the airbag 200 is instantly inflated.

The rotation mechanism 130 is a device that rotates the support members 115 with respect to the airbag housing 120 around a rotation axis Ab extending in the width direction of the vehicle. The rotation mechanism 130 includes a rotation motor 131 configured to rotate the support members 115. In the embodiment, referring to one of the support members 115 means referring to the pair of support members 115 connected to the rotation mechanism 130. For example, "rotating the support member 115" means that the pair of support members 115 connected to the rotation mechanism 130 is integrally rotated. The operation member 110 does not need to be supported by the pair of support members 115, and the operation member 110 is supported by at least one support member 115.

A driving force of the rotation mechanism 130 causes the support member 115 to rotate around the rotation axis Ab, so that the operation member 110 supported by the support member 115 also rotates about the rotation axis Ab. The operation member 110 thus rotates with respect to the airbag housing 120 fixed to the rotation mechanism 130. The operation member 110 rotates in accordance with a deploying movement and a retracting movement of the operation member 110 (deployment from a storage area and retraction into the storage area).

The steering system 100 according to the embodiment further includes, as shown in FIG. 1, a switch holding unit 140 and a reaction force generator 150 disposed in front of the rotation mechanism 130 (on a minus side in the X-axis direction). The switch holding unit 140 is a member that holds a switch configured to operate a turn signal, and so on. The switch holding unit 140 is connected to a turn signal lever and so on (not shown).

The reaction force generator 150 is a device that applies a torque against a driver's force to the operation member 110 when the driver operates the operation member 110 for steering. The reaction force generator 150 includes a reaction force motor 151 and so on. The reaction force generator 150 is a device that reproduces, as a reaction force, a force or the like generated on a steering member during driving in the vehicle in the related art in which the tires and the operation member are mechanically connected. That is, in the embodiment, a first end of a shaft body is fixed to the rotation mechanism 130, and a second end of the shaft body is connected to the reaction force generator 150. The shaft body is inserted through the switch holding unit 140 and rotates around the steering axis Aa. The reaction force generator 150 applies the reaction force to the operation member 110 via the shaft body. The reaction force generator 150 controls a rotational position of the operation member 110 around the steering axis Aa.

The steering system 100 further includes a mechanism that changes a position and a posture of a steering mechanism 101 including the operation member 110, the support member 115, the airbag housing 120, the rotation mechanism 130, the switch holding unit 140, and the reaction force generator 150 described above. Thus, it is possible to change a distance between the operation member 110 and the driver and an inclination of the operation member 110 with respect to the driver.

Specifically, the steering system 100 includes a slide mechanism 170 as shown in FIG. 1. The slide mechanism 170 is an example of a first movement mechanism. The slide mechanism 170 can move the operation member 110 between a normal position at which the operation member 110 is operated by the driver, and a storage area located forward of the normal position. Specifically, the slide mechanism 170 moves the operation member 110 in the front-rear direction by moving the steering mechanism 101 including the operation member 110 in the front-rear direction.

In the embodiment, the steering mechanism 101 is supported by a base guide 161 via a movable body 162, and the movable body 162 is held by the base guide 161 so as to be slidable. The base guide 161 is fixed to the vehicle via, for example, a bracket (not shown). As shown in FIG. 1, a slide drive shaft 173 is fixed to the base guide 161, and a main body including the slide motor 172 is moved along the slide drive shaft 173 by a driving force of the slide motor 172 of the slide mechanism 170. Accordingly, the movable body 162 connected to the main body of the slide mechanism 170 moves in the front-rear direction along the base guide 161. Thus, the steering mechanism 101 including the operation member 110 moves in the front-rear direction.

As shown in FIG. 1, the steering system 100 includes a tilt mechanism 180 that changes the inclination of the steering mechanism 101. In FIG. 1, to clearly show the tilt mechanism 180, the tilt mechanism 180 is illustrated separately from the steering mechanism 101 and below the steering mechanism 101. The tilt mechanism 180 is an example of a second movement mechanism, and moves the operation member 110 to change the position of the operation member 110 in an up-down direction of the vehicle. Specifically, the tilt mechanism 180 can push up the steering mechanism 101 from a low position to an upper limit position and return the pushed steering mechanism 101 to a lower limit position with the use of a driving force of a tilt motor 181. In the embodiment, the steering mechanism 101 is supported by the movable body 162 so as to be rotatable around a tilt axis Ac. The steering mechanism 101 is driven to move upward and downward by the tilt mechanism 180 such that the inclination angle of the steering mechanism 101 around the tilt axis Ac is changed. This changes the positions of the operation member 110, the airbag housing 120, and the rotation mechanism 130 in the up-down direction of the vehicle. In the steering mechanism 101, the operation member 110, the airbag housing 120, and the rotation mechanism 130 are located on the driver side (i.e., located close to the driver). Note that the position of the tilt axis Ac shown in FIG. 1 is an example, and the tilt axis Ac may be located forward (on the minus side in the X-axis direction) of its position shown in FIG. 1.

The rotation mechanism 130, the reaction force generator 150, the slide mechanism 170, and the tilt mechanism 180 described above are controlled by a control unit 190 (see FIG. 2) provided in the steering system 100. Accordingly, the slide mechanism 170 and the tilt mechanism 180 perform operations of changing the position and the posture of the steering mechanism 101. The operations are performed when the position in the front-rear direction and the height (inclination) of the operation member 110 are adjusted in accordance with the driver's preference. The rotation mechanism 130 performs an operation of rotating the operation member 110 around the rotation axis Ab by rotating the support member 115. The above-described operations of the reaction force generator 150, the slide mechanism 170, the tilt mechanism 180, and the rotation mechanism 130 are performed when the operation member 110 is deployed from the storage area and retracted into the storage area in the dashboard. The control unit 190 uses information acquired from each of the rotation mechanism 130, the slide mechanism 170, and the tilt mechanism 180 to identify the position, the posture, and the like of the operation member 110 in the vehicle as necessary.

It should be noted that the deployment and the retraction of the operation member 110 may be performed in accordance with an instruction from the driver, or may be performed without an instruction from the driver. Specifically, the vehicle including the steering system 100 is provided with an autonomous (automatic) driving system (not shown) including various sensors, wireless communication functions, and the like, in addition to electric components such as a switch, a button, and a touch panel that receive the instruction from the driver. Accordingly, the steering system 100 can deploy and retract the operation member 110 in accordance with the instruction from the driver, and can also deploy and retract the operation member 110 in cooperation with the autonomous driving system. The vehicle may be provided with sensors that detect various vehicle states such as whether the driver is seated in a driver's seat, opening and closing of a door, and an acceleration of the vehicle. In this case, the steering system 100 may deploy and retract the operation member 110 in accordance with the vehicle states detected by the sensors.

For example, when the driver performs a predetermined operation such as pressing a button or inputting voice by speech while the vehicle is in a stop state, the control unit 190 can retract the operation member 110 that is in the normal position into the storage area in accordance with the instruction from the driver. Also, for example, when the control unit 190 detects that an autonomous driving level has been changed from a level that requires monitoring by the driver to a level that does not require monitoring by the driver while the vehicle is being driven by the autonomous driving system, the control unit 190 can retract the operation member 110 that is in the normal position into the storage area without the instruction from the driver. Furthermore, when the control unit 190 detects that the autonomous driving level has been changed from the level that does not require monitoring by the driver to the level that requires monitoring by the driver while the vehicle is being driven by the autonomous driving system, the control unit 190 can deploy the operation member 110 that is in the storage area without the instruction from the driver. In these cases, when the deploying movement and the retracting movement are not allowed to be performed without the instruction from the driver, automatic deployment and retraction of the operation member 110 can be restrained. For example, the level that requires monitoring by the driver is a level that is equal to or lower than autonomous driving level 2, and the level that does not require monitoring by the driver is a level that is equal to or higher than autonomous driving level 3.

The autonomous driving level 2 is a level in which the autonomous driving system is allowed to partially perform operations related to driving. The autonomous driving level 3 is a level in which the autonomous driving system is allowed to perform all operations related to driving under limited conditions. In the autonomous driving level 3, monitoring and operation by the driver is necessary in the event of an emergency. In this case, the operation member 110 needs to be deployed at the normal position (or a position forward of the normal position, at which the operation member 110 can be operated by the driver) so that the driver can operate the operation member 110 in the event of an emergency. Autonomous driving level 4 is a level in which the autonomous driving system is allowed to perform all operations related to driving, and the autonomous driving system is also allowed to perform operations in the event of an emergency. In this case, since the driver does not need to operate the operation member 110, the operation member 110 is allowed to be retracted into the storage area.

The control unit 190 that performs the above control is realized by, for example, a computer including a central processing unit (CPU), a storage device such as a memory, and an interface for inputting and outputting information. For example, when the CPU executes a predetermined program stored in the storage device, the control unit 190 can perform movement control for the steering system 100 in accordance with a control signal transmitted from an upper control unit (i.e., a higher level control unit) 300 or the like and the detection results from the sensor(s).

Here, one feature of the steering system 100 according to the embodiment is that, when the operation member 110 is deployed from the storage area or retracted into the storage area, the position or the posture of the operation member 110 is changed in consideration of the efficiency of the deploying movement and the retracting movement and the safety of the driver. A specific example of the deploying movement and the retracting movement of the operation member 110 in the steering system 100 according to the embodiment will be described with reference to FIGS. 3 to 9.

Figure 3:
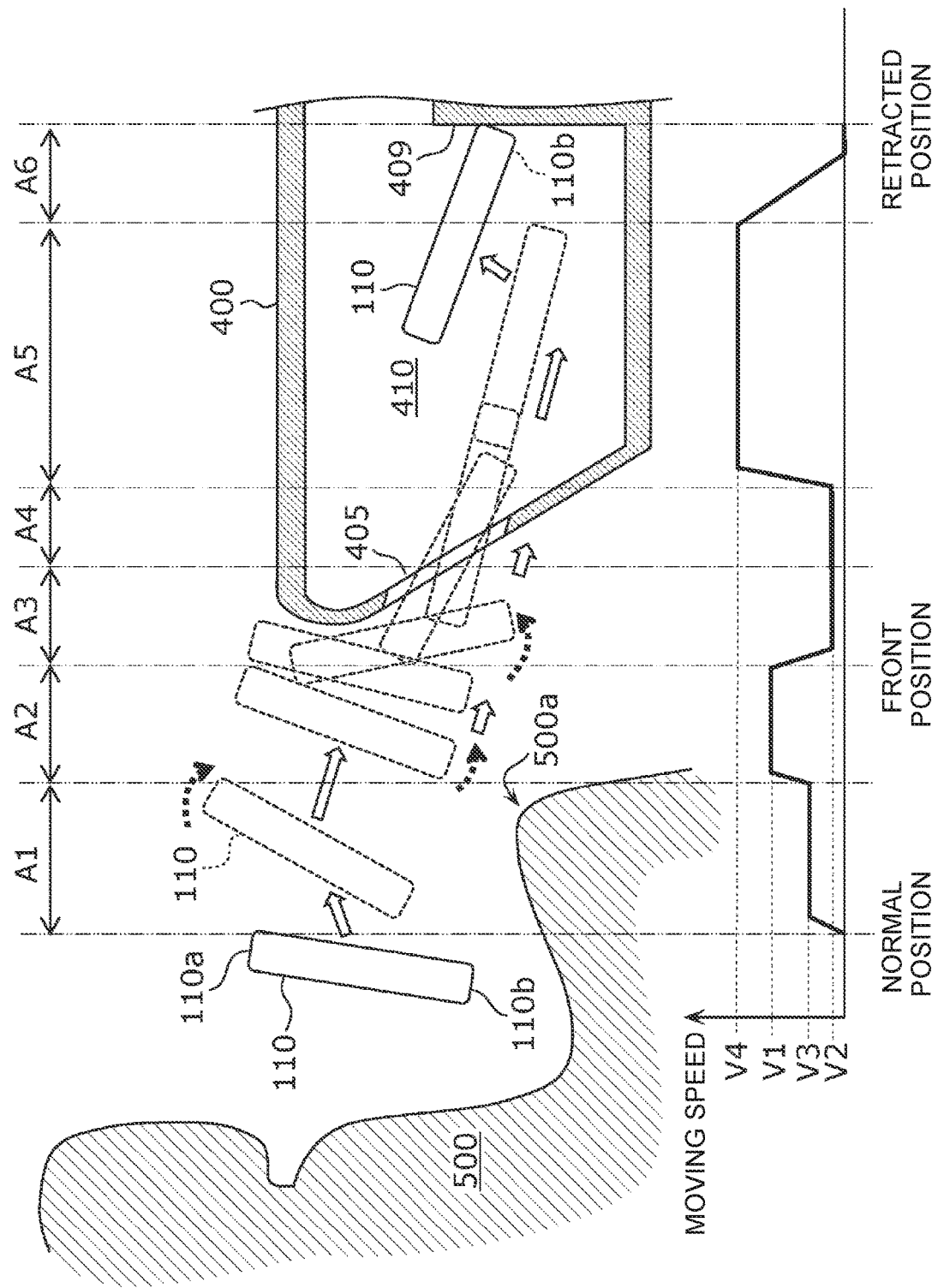
FIG. 3 is a diagram showing an example of a retracting movement of an operation member according to the embodiment.
Figure 4:
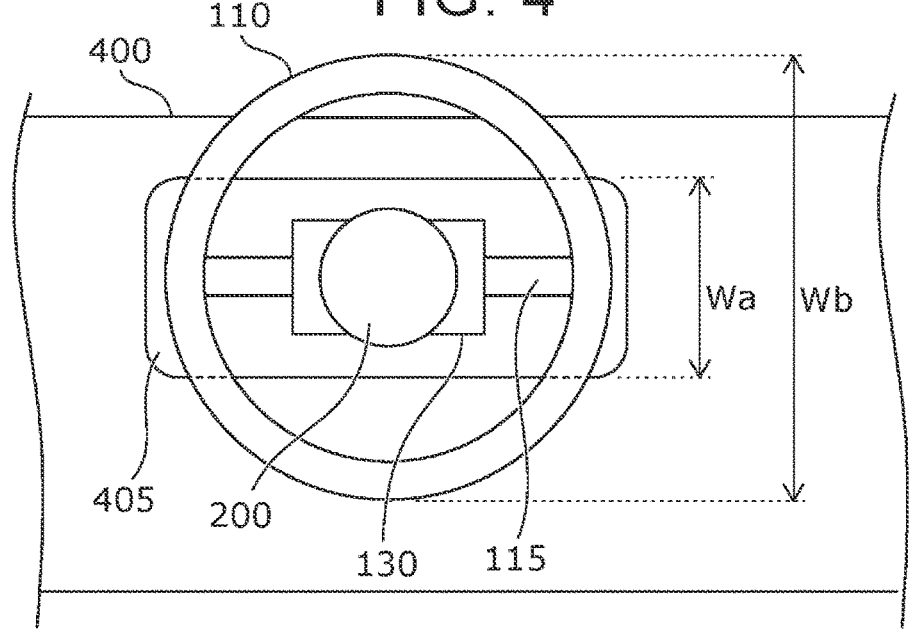
FIG. 4 is a diagram showing a dimensional relationship between the operation member according to the embodiment and an opening provided in a dashboard.
Figure 5:
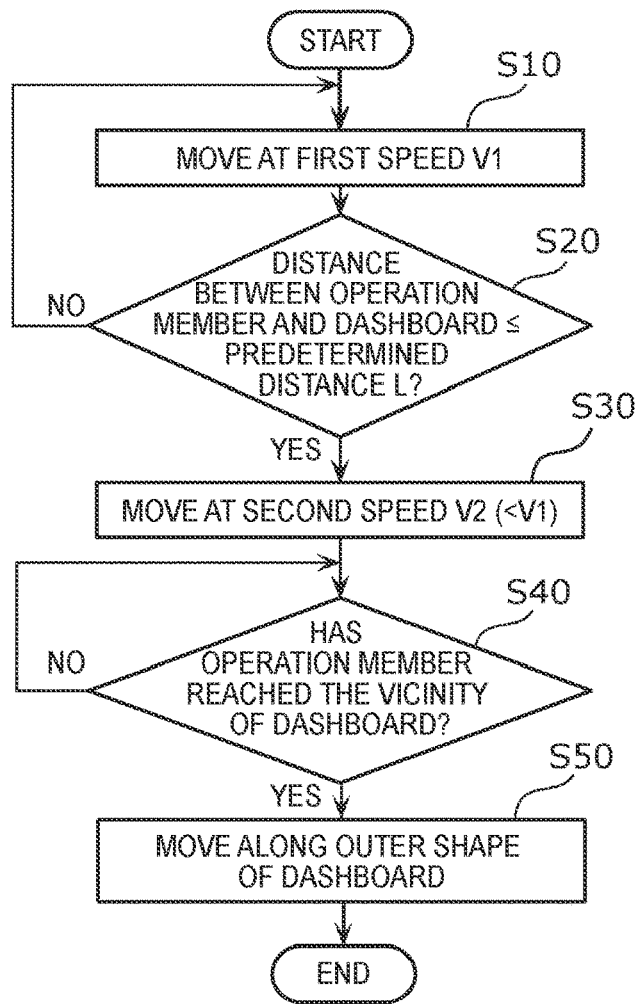
FIG. 5 is a flowchart showing an outline of the retracting movement of the operation member in the steering system according to the embodiment.

First, an example of the retracting movement of the operation member 110 will be described with reference to FIGS. 3 to 5. FIG. 3 is a diagram showing an example of the retracting movement of the operation member 110 according to the embodiment. FIG. 4 is a diagram showing a dimensional relationship between the operation member 110 according to the embodiment and an opening 405 provided in a dashboard 400. FIG. 5 is a flowchart showing an outline of the retracting movement of the operation member 110 in the steering system 100 according to the embodiment.

In FIG. 3, an operation member 110-side part of an area in which the driver is present (i.e., a part of the area, which is located close to the operation member 110) is indicated as a hatched driver area 500. The dashboard 400 is simply shown in section to indicate a storage area 410. In FIG. 3, illustration of elements other than the operation member 110, the dashboard 400, and the driver area 500 is omitted to indicate the positional relationship of the operation member 110, the dashboard 400, and the driver area 500. The arrows in FIG. 3 indicate an approximate movement direction or an approximate rotation direction of the operation member 110. These supplementary items in FIG. 3 also apply to FIGS. 6 to 8 described later. In FIG. 3, changes in a moving speed of the operation member 110 are indicated by a line graph associated with approximate positions of the operation member 110. The movement of the operation member 110 for deployment and retraction is mainly performed by the slide mechanism 170. Thus, the "moving speed of the operation member 110" is equal to a speed at which the slide mechanism 170 moves the steering mechanism 101 (see FIG. 1) including the operation member 110, unless otherwise specified.

In the embodiment, the base guide 161 (see FIG. 1) of the steering system 100 is fixed to a vehicle body in the dashboard 400. The steering system 100 can move the operation member 110 between the normal position and the storage area 410 in the dashboard 400. The dashboard 400 is an example of a vehicle member provided in front of the driver's seat. As shown in FIG. 3, in the dashboard 400, the opening 405 is provided on a surface facing the driver, and the storage area 410 for storing the operation member 110 (i.e., the storage area 410 into which the operation member 110 is retracted) is provided inward of the opening 405.

In the above configuration, the steering system 100 retracts the operation member 110 that is in the normal position into the storage area 410 while changing the position and the posture of the operation member 110 as shown in FIG. 3. As shown in FIG. 4, a vertical width Wa of the opening 405 is smaller than a vertical width Wb of the operation member 110. Thus, during the retraction, the operation member 110 is rotated around the rotation axis Ab (See FIG. 1) extending in the width direction of the vehicle to be inserted into the opening 405 and accommodated in the storage area 410. Note that the shape of the opening 405 shown in FIG. 4 is an example, and there is no particular limitation on the shape of the opening 405. The opening 405 has a shape and a size that allow members such as the operation member 110 and the rotation mechanism 130 to be inserted into the opening 405 and to pass through the opening 405.

The above-described retracting movement of the operation member 110 in the steering system 100 can be divided into six sections A1 to A6, for example, as shown in FIG. 3. Further, as shown in FIG. 3, the moving speed of the operation member 110 moved by the slide mechanism 170 also changes. In other words, the operation member 110 in the normal position enters the opening 405 so as to slide into the opening 405 (A1 to A4) while being moved in the up-down direction and rotated around the rotation axis Ab (see FIG. 1). Thereafter, the operation member 110 stops at a position at which the operation member 110 contacts a wall 409 in the storage area 410 (A5, A6).

A series of the retracting movement described above include a characteristic movement shown in FIG. 5. That is, the retracting movement of the operation member 110 includes moving the operation member 110 to the vicinity of the dashboard 400 and moving the operation member 110 along an outer shape of the dashboard 400.

Specifically, when retracting the operation member 110 into the storage area 410, the control unit 190 controls the slide mechanism 170 to move the operation member 110 as follows. The control unit 190 moves the operation member 110 forward at a first speed V1 (S10), and when a distance between the operation member 110 and the dashboard 400 becomes equal to or less than a predetermined distance L (Yes in S20), the control unit 190 moves the operation member 110 forward at a second speed V2 (<V1) (S30). In the embodiment, when at least a part of the operation member 110 reaches a "front position" in FIG. 3, the moving speed of the operation member 110 is changed from the first speed V1 to the second speed V2. The front position is, for example, a position at a distance of approximately 5 cm to 10 cm from the dashboard 400. That is, the predetermined distance L is approximately 5 cm to 10 cm.

Thereafter, when the operation member 110 reaches the vicinity of the dashboard 400 (Yes in S40), the control unit 190 controls the slide mechanism 170 and the tilt mechanism 180 to perform a forward movement (S50) of moving the operation member 110 along the outer shape of the dashboard 400. The vicinity of the dashboard 400 is a position closer to the dashboard 400 than the above-described front position, and is, for example, a position at a distance of approximately 1 cm to 2 cm from the dashboard 400.

The operations in steps S10 to S30 correspond to the movement in section A2 in FIG. 3, and the operations in steps S40 to S50 correspond to the movement in section A3 in FIG. 3.

As described above, in the embodiment, when the operation member 110 is moved forward to be retracted, the control unit 190 reduces the moving speed of the operation member 110 that is triggered by the operation member 110 reaching a position within the predetermined distance L from the dashboard 400. This reduces the possibility that the driver's finger or the like is caught between the operation member 110 and the dashboard 400. For example, even when the driver is holding the operation member 110 at the start of the retraction of the operation member 110, the driver is given enough time to release his/her hand from the operation member 110. Also, even when a part of the body of the driver such as the driver's finger or the driver's hand is placed between the operation member 110 and the dashboard 400 while the operation member 110 approaches the dashboard 400, the operation member 110 moves at a low speed (the second speed V2), so there is little possibility that the part of the body of the driver is damaged. In addition, since the operation member 110 can move at a relatively high speed (the first speed V1) until the operation member 110 reaches the position within the predetermined distance L from the dashboard 400, the space in front of the driver can be expanded in a relatively short period of time. Moreover, since the operation member 110 can move at a relatively high speed (the first speed V1) until the operation member 110 reaches the position within the predetermined distance L from the dashboard 400, an increase in time required for the operation member 110 to be retracted is restrained.

Note that there is no particular limitation on the method of detecting the distance between the operation member 110 and the dashboard 400 and the method of detecting the position of the operation member 110. For example, the control unit 190 may detect the distance between the operation member 110 and the dashboard 400 using the information (such as an encoder value of the slide motor 172) acquired from the slide mechanism 170. In this case, for example, the control unit 190 may determine that the distance between the operation member 110 and the dashboard 400 has become equal to or less than the predetermined distance L when a slide amount, which is the distance the slide mechanism 170 has slid, exceeds a predetermined value. The predetermined value may be set in accordance with the normal position before the operation member 110 is retracted into the storage area 410. Further, for example, the distance between the operation member 110 and the dashboard 400 may be detected using a detection result regarding the operation member 110 from a sensor such as a camera. The detection (calculation) of the distance or the position of the operation member 110 does not need to be directly performed by the control unit 190. For example, the upper control unit 300 may calculate the distance between the operation member 110 and the dashboard 400, and the control unit 190 may acquire, from the upper control unit 300, the information indicating the distance therebetween.

The control unit 190 may also determine the position of the operation member 110 with respect to the dashboard 400 (S20 and S40 in FIG. 5) without directly using the distance between the operation member 110 and the dashboard 400. For example, the control unit 190 may make the determination by comparing the information acquired from the slide mechanism 170 with information stored in advance.

The control unit 190 moves the operation member 110 along the outer shape of the dashboard 400 in the forward movement that is performed after the operation member 110 reaches the position within the predetermined distance L from the dashboard 400. Specifically, the outer shape of the dashboard 400 in a side view is formed so as to protrude rearward (toward the driver's seat), for example, as shown in FIG. 3. For example, an upper end side of the dashboard 400 protrudes rearward as compared with a lower end side of the dashboard 400, and the dashboard 400 is formed such that the dashboard 400 is inclined forward, (i.e., the distance from the driver area 500 increases) in a direction from the upper end side of the dashboard 400 toward the lower end side of the dashboard 400. The operation member 110 is moved along the protruding outer shape of the dashboard 400. That is, in the embodiment, in the vicinity of the dashboard 400, the operation member 110 is moved toward the opening 405 while the operation member 110 takes such a posture that an upper end portion 110a and a lower end portion 110b of the operation member 110 having a three-dimensional structure are restrained from protruding toward the driver area 500 as much as possible. This reduces the possibility that the operation member 110 interferes with the driver while being retracted.

As described above, with the steering system 100 according to the embodiment, it is possible to expand the space in front of the driver and improve the safety of the driver.

The retracting movement of the operation member 110 including the above movement will be described in more detail with reference to FIG. 3. First, in section A1, the operation member 110 that is in the normal position in front of the driver area 500 is moved so as to pass a knee area 500a corresponding to the position of the driver's knee. The knee area 500a is a part of the driver area 500 and is an area in which the driver's knee is assumed to be located while the driver is seated in the driver's seat.

Specifically, the control unit 190 controls the slide mechanism 170 and the tilt mechanism 180 to perform initial movement of moving the operation member 110 forward and moving the operation member 110 upward simultaneously (i.e., at the same time).

Thus, the operation member 110 is moved in a path that avoids a knee part of the driver, which is likely to interfere with the operation member 110 when the operation member 110 is moved forward. The safety of the driver is therefore improved. Further, the slide mechanism 170 moves the operation member 110 forward and the tilt mechanism 180 moves the operation member 110 upward simultaneously (i.e., at the same time). Thus, the operation member 110 is moved forward in the shortest distance, for example, while avoiding the knee area 500a. This is advantageous for increasing the efficiency of the retracting movement of the operation member 110.

In the embodiment, the moving speed of the operation member 110 in the initial movement is, for example, a speed between the first speed V1 and the second speed V2 described above. Specifically, in the initial movement, the control unit 190 controls the slide mechanism 170 to move the operation member 110 forward at a third speed V3 that is higher than the second speed V2 and lower than the first speed V1. When the initial movement ends, the control unit 190 changes the moving speed of the operation member 110 to the first speed V1.

With the above configuration, in the initial movement that is performed in front of the driver and at least involves the upward movement of the operation member 110, the operation member 110 is moved forward at the third speed V3 that is an intermediate speed. Thus, the operation member 110 can be moved forward efficiently while ensuring the safety of the driver. Moreover, the moving speed of the operation member 110 is changed to the first speed V1 that is higher than the third speed V3 when the operation member 110 reaches a position at which it is assumed that the operation member 110 has mostly passed the knee area 500a (i.e., when the operation member 110 reaches a boundary position between the section A1 and the section A2), and the moving speed of the operation member 110 is the first speed V1 thereafter. This restrains the increase in the time required for the operation member 110 to be retracted. When the control unit 190 changes the moving speed of the operation member 110 from the third speed V3 to the first speed V1, the control unit 190 may control the movement of the operation member 110 so that the moving speed gradually increases. In this way, for example, the driver can easily recognize the increase in the moving speed of the operation member 110, thereby further reducing the possibility that the operation member 110 interferes with the driver while being retracted.

In the steering system 100 according to the embodiment, in the initial movement, the control unit 190 further controls the rotation mechanism 130 to change the posture of the operation member 110 so as to ensure the safety of the driver more reliably. Specifically, in the initial movement, the control unit 190 further controls the rotation mechanism 130 to rotate the operation member 110 so that the lower end portion 110b of the operation member 110 is moved upward.

Thus, in the initial movement, the operation member 110 is rotated so that the lower end portion 110b of the operation member 110 is lifted. This reduces the possibility that the operation member 110 interferes with the knee part of the driver when the operation member 110 is retracted. More specifically, it is preferable that the operation member 110 be rotated in a direction in which the upper end portion 110a falls forward (in a clockwise direction in FIG. 3). Thus, the lower end portion 110b of the operation member 110 is lifted while moving rearward (in a direction away from the knee part of the driver) with respect to the rotation mechanism 130. This further reduces the possibility that the operation member 110 interferes with the knee part of the driver when being retracted. Even when a moving amount of the operation member 110 moved by the tilt mechanism 180 is relatively small, as long as the rotation mechanism 130 rotates the operation member 110, the lower end portion 110b of the operation member 110 can be lifted to a position high enough to avoid the knee area 500a. Thus, the forward movement of the operation member 110 while avoiding the knee area 500a can be performed more quickly and safely.

After the initial movement, in the section A2, as described above, the control unit 190 moves the operation member 110 at the first speed V1. In the section A2, the operation member 110 that is rotated so that the upper end portion 110a is tilted forward in the initial movement (the section A1 in FIG. 3) is moved to the front position at the first speed V1 while being rotated in a reverse direction (a direction in which the lower end portion 110b faces forward), for example. That is, the control unit 190 controls the rotation mechanism 130 and the slide mechanism 170 to move the operation member 110 forward, while raising the operation member 110 that has been tilted so as to fall forward.

Thereafter, when a part of the operation member 110 (for example, the upper end portion 110a) reaches the front position, that is, when the distance between the operation member 110 and the dashboard 400 becomes equal to or less than the predetermined distance L, the moving speed of the operation member 110 is reduced as described above. Specifically, the control unit 190 controls the slide mechanism 170 to change the moving speed of the operation member 110 from the first speed V1 to the second speed V2.

After the operation member 110 has reached the front position, in the section A3, the operation member 110 is brought closer to the dashboard 400 at a low speed (the second speed V2). Then, as described above, after the operation member 110 has reached the vicinity of the dashboard 400, the operation member 110 moves toward the opening 405 in the forward movement. That is, the operation member 110 is moved along the outer shape of the dashboard 400 under the control of the control unit 190.

Specifically, the control unit 190 controls the rotation mechanism 130 to tilt the operation member 110 in a direction in which the lower end portion 110b faces forward (in a counterclockwise direction in FIG. 3) as shown in FIG. 3. At this time, the operation member 110 is moved closer to the opening 405 by the slide mechanism 170 and the tilt mechanism 180. That is, the control unit 190 further controls the rotation mechanism 130 to move the upper end portion 110a of the operation member 110 along the outer shape of the dashboard 400 in the forward movement.

Since the operation member 110 is rotated in the counterclockwise direction in FIG. 3 in the forward movement, the upper end portion 110a of the operation member 110 may protrude toward the driver area 500. Thus, the control unit 190 according to the embodiment controls the slide mechanism 170, the tilt mechanism 180, and the rotation mechanism 130 to move the operation member 110 so that the upper end portion 110a of the operation member 110 moves along the outer shape of the dashboard 400. This reduces the amount of protrusion of the operation member 110 toward the driver area 500 in the forward movement, and thereby reduces the possibility that the operation member 110 interferes with the driver.

As shown in FIG. 4, the vertical width Wb of the operation member 110 is larger than the vertical width Wa of the opening 405 when the operation member 110 is disposed along the opening 405 and viewed from an opening direction in which the opening 405 is opened. When inserting the operation member 110 into the opening 405, the control unit 190 controls the slide mechanism 170, the tilt mechanism 180, and the rotation mechanism 130 to insert the operation member 110 into the opening 405 from the lower end portion 110b, the operation member 110 being rotated such that the lower end portion 110b of the operation member 110 faces forward.

That is, when the operation member 110 is moved so that the upper end portion 110a of the operation member 110 is moved along the outer shape of the dashboard 400, the operation member 110 is rotated so that the lower end portion 110b faces forward in the section A4. As an extension of the flow of the series of the movement, the operation member 110 is inserted into the opening 405 from the lower end portion 110b. That is, the operation member 110 enters the storage area 410 through the opening 405 with an efficient movement. Thus, the retracting movement of the operation member 110 can be performed efficiently, and the opening 405 can be made relatively small. By reducing the size of the opening 405, for example, the strength or the rigidity of the dashboard 400 can be easily secured. When the opening 405 is closed by an opening/closing mechanism such as a door or a shutter, the configuration of the opening/closing mechanism can be simplified by reducing the size of the opening 405.

After the operation member 110 has been inserted into the opening 405 in the section A4, the control unit 190 increases the moving speed of the operation member 110 in the section A5. Specifically, the control unit 190 increases the moving speed at which the operation member 110 is moved forward by the slide mechanism 170 after at least a part of the operation member 110 has reached the inside of the storage area 410 and the downward movement of the operation member 110 caused by the tilt mechanism 180 has been completed.

That is, when the operation member 110 has reached the storage area 410, the issue of interference between the operation member 110 and the driver does not occur, and thus, the control unit 190 moves the operation member 110 at a high speed with priority being given to efficiency. For example, as shown in FIG. 3, the control unit 190 moves the operation member 110 at a fourth speed V4 that is the highest speed in the retracting movement of the operation member 110.

When the operation member 110 has reached a predetermined position, that is, a first predetermined position in the storage area 410 (an end of the section A5 in FIG. 3), the control unit 190 further controls the tilt mechanism 180 to move the operation member 110 upward in the storage area 410.

Here, since the operation member 110 is retracted obliquely downward in the storage area 410, a relatively low position in front of the driver can be set as the retracted position (final position in the retracting movement). However, when a collision of the vehicle occurs in a state where the operation member 110 is in the retracted position, a lower leg of the driver may collide with the operation member 110 that is fixed in the steering system 100. In view of this, in the steering system 100 according to the embodiment, an operation of lifting the operation member 110 upward is performed as the last movement in the retracting movement of the operation member 110. This reduces the possibility of collision between the operation member 110 and the lower leg of the driver in the state in which the operation member 110 is retracted.

Further, in the embodiment, at the completion of the retraction of the operation member 110, the operation member 110 is stopped while contacting a member of which the position is fixed in the vehicle. That is, the control unit 190 completes the retraction of the operation member 110 with a portion of the operation member 110 contacting a surface defining the storage area 410 or a member fixed in the storage area 410. For example, as shown in FIG. 3, the operation member 110 is stopped with the lower end portion 110b of the operation member 110 contacting the wall 409 in the storage area 410. More specifically, the operation member 110 is stopped with the lower end portion 110b being pressed against the wall 409.

With the above configuration, for example, when the vehicle is driven by the autonomous driving system with the operation member 110 being in the retracted position, vibration or movement of the operation member 110 is restrained. This restrains occurrence of abnormal noise or damage to the operation member 110 due to contact of the operation member 110 with a nearby member, for example. The shape or the position of the member that the operation member 110 contacts is not limited. For example, the operation member 110 may stop while contacting a bottom surface of the dashboard 400. By providing a flexible member such as rubber at the portion that the operation member 110 contacts, the operation member 110 can be firmly pressed against the portion without causing damage to the operation member 110.

Although the retracting movement of the operation member 110 in the steering system 100 according to the embodiment has been described above, the retracting movement described above is an example, and a part of the retracting movement may be replaced with a different movement.

Modifications of the retracting movement of the operation member 110 will be described with reference to FIGS. 6 and 7.

Figure 6:
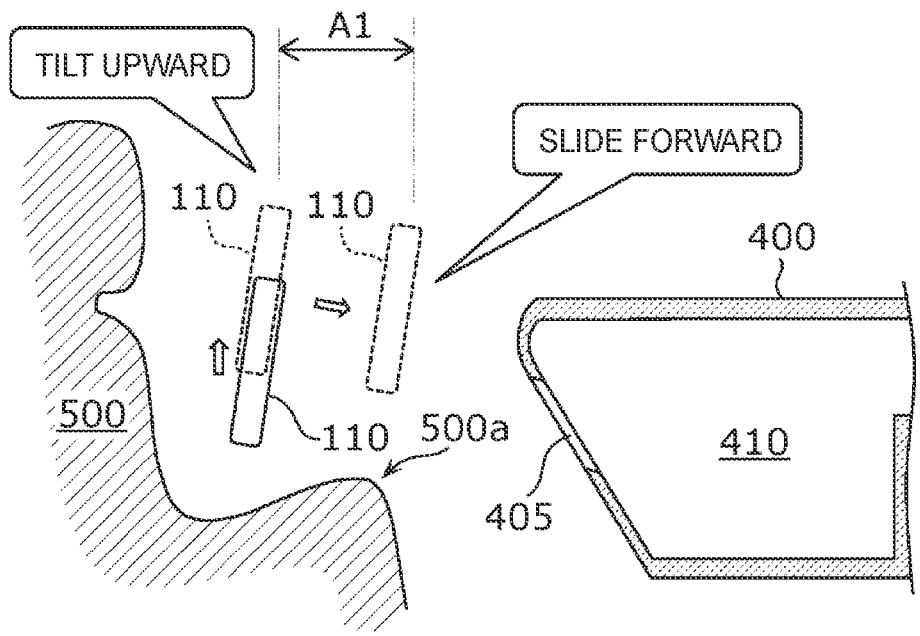
FIG. 6 is a diagram showing a part of a retracting movement of the operation member according to a first modification of the embodiment.

FIG. 6 is a diagram showing a part of the retracting movement of the operation member 110 according to a first modification of the embodiment. Specifically, FIG. 6 shows an outline of an initial movement in the first modification. As shown in FIG. 6, at the start of the retraction of the operation member 110 into the storage area 410, the control unit 190 according to the first modification controls the slide mechanism 170 and the tilt mechanism 180 to start the forward movement of the operation member 110 after the upward movement of the operation member 110. As described above, by moving the operation member 110 such that the operation member 110 escapes upward first, and then moving the operation member 110 forward, the operation member 110 can be moved forward while avoiding the knee area 500a.

Figure 7:
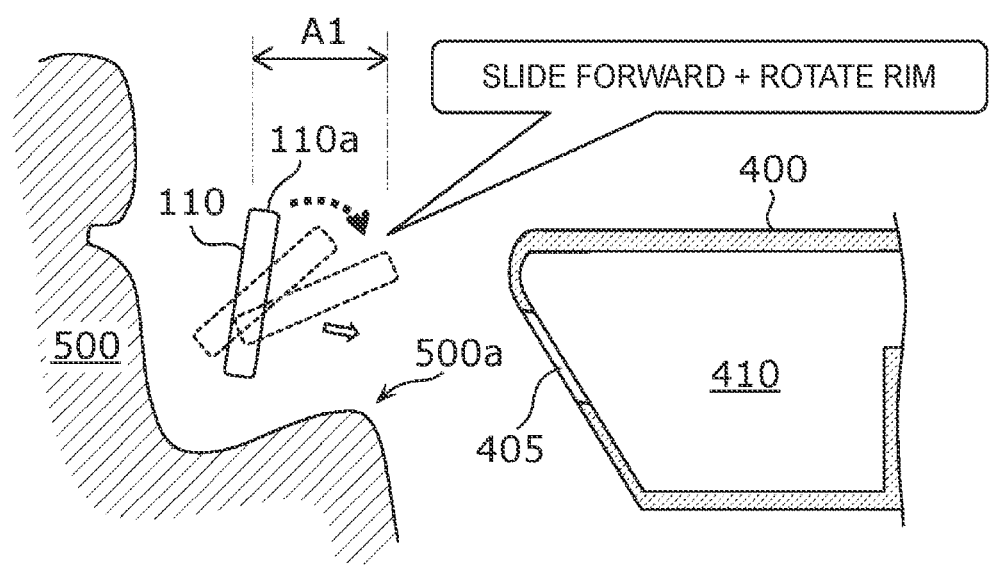
FIG. 7 is a diagram showing a part of a retracting movement of the operation member according to a second modification of the embodiment.

FIG. 7 is a diagram showing a part of the retracting movement of the operation member 110 according to a second modification of the embodiment. Specifically, FIG. 7 shows an outline of an initial movement in the second modification. As shown in FIG. 7, at the start of the retraction of the operation member 110 into the storage area 410, the control unit 190 according to the second modification controls the slide mechanism 170 and the rotation mechanism 130 to perform the initial movement of moving the operation member 110 forward and rotating the operation member 110 simultaneously (i.e., at the same time).

That is, when the operation member 110 is retracted, the knee area 500a can be avoided by rotating the operation member 110 around the rotation axis Ab (see FIG. 1) without moving the operation member 110 upward. In this case, the rotation direction of the operation member 110 may be the clockwise direction in FIG. 7 or the counterclockwise direction in FIG. 7. As shown in FIG. 7, when the rotation direction of the operation member 110 is the clockwise direction, for example, the operation member 110 can be moved forward while the upper end portion 110a of the operation member 110 is tilted forward (that is, the lower end portion 110b is moved so as to escape rearward and upward). Thus, the retracting movement of the operation member 110 can be performed efficiently.

Figure 8:
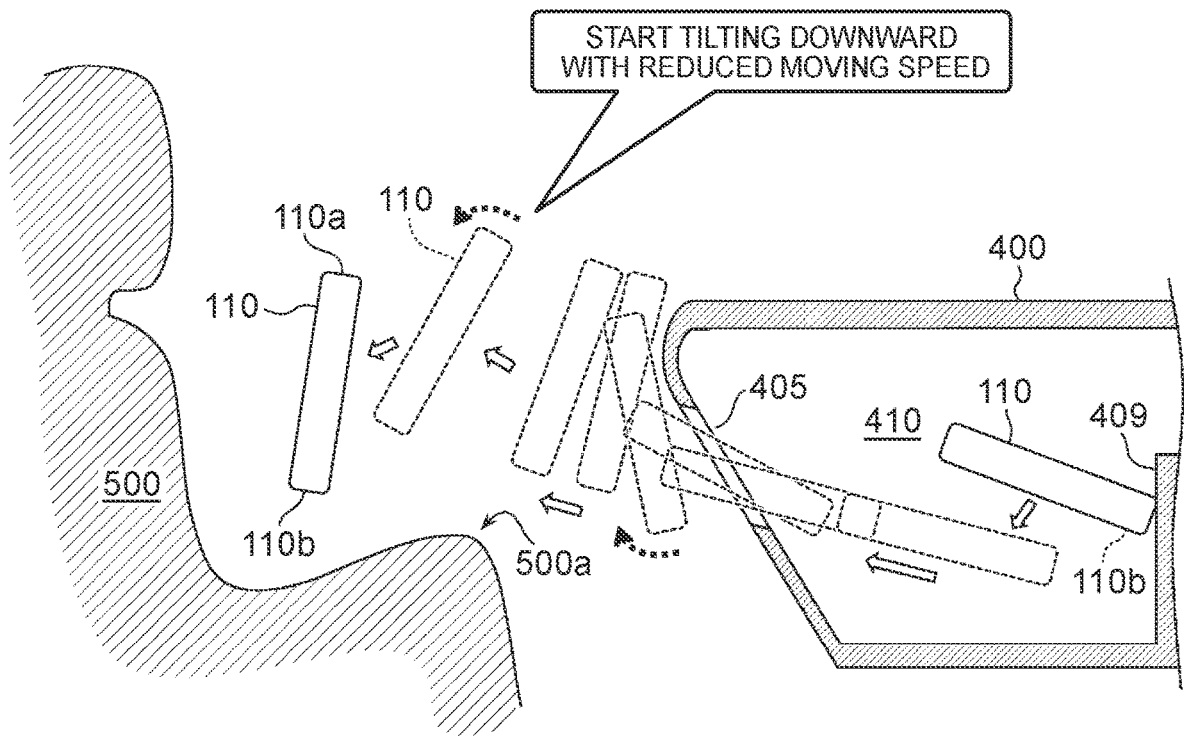
FIG. 8 is a diagram showing an example of an deploying movement of the operation member according to the embodiment.
Figure 9:
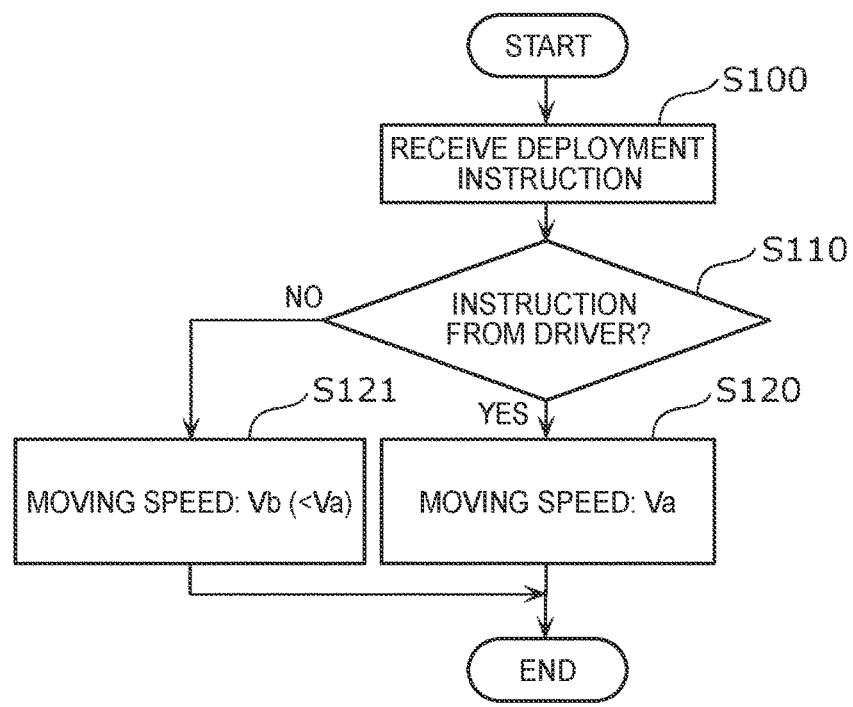
FIG. 9 is a flowchart showing an example of speed control in the deploying movement of the operation member according to the embodiment.

Next, an example of the deploying movement of the operation member 110 will be described with reference to FIGS. 8 and 9. FIG. 8 is a diagram showing an example of the deploying movement of the operation member 110 according to the embodiment. FIG. 9 is a flowchart showing an example of speed control in the deploying movement of the operation member 110 according to the embodiment.

As shown in FIG. 8, the steering system 100 according to the embodiment can deploy the operation member 110 that is retracted in the storage area 410 to the normal position. When a trajectory of the operation member 110 in the deployment (deploying movement) of the operation member 110 is followed in reverse, the trajectory substantially coincides with a trajectory of the operation member 110 in the retracting movement of the operation member 110 that has been described with reference to figures including FIG. 3. That is, there is a mutually inverse relationship between a transition of the position and the posture of the operation member 110 in the deploying movement of the operation member 110 and a transition of the position and the posture of the operation member 110 in the retracting movement of the operation member 110 that has been described with reference to figures including FIG. 3.

The deploying movement of the operation member 110 is performed as follows under the control of the control unit 190. The operation member 110 that is stopped while contacting the wall 409 in the storage area 410 is moved rearward (toward the opening 405) by the slide mechanism 170 and the tilt mechanism 180. At this time, the operation member 110 moves at a maximum speed while the entire operation member 110 is located within the storage area 410. Thereafter, the operation member 110 moves out of the opening 405 from the upper end portion 110a at a reduced moving speed. The operation member 110 that has moved out of the opening 405 is moved along the outer shape of the dashboard 400 by the slide mechanism 170, the tilt mechanism 180, and the rotation mechanism 130. Thereafter, the operation member 110 is moved rearward at an increased speed by the slide mechanism 170, and is further moved upward by the tilt mechanism 180 so as to avoid the knee area 500a of the driver area 500. At this time, the operation member 110 that has been tilted so that the upper end portion 110a faces forward is rotated by the rotation mechanism 130 in a direction in which the upper end portion 110a moves rearward. When the operation member 110 has passed the knee area 500a, the slide mechanism 170 reduces the moving speed of the operation member 110, and the tilt mechanism 180 moves the operation member 110 downward. Thereafter, the operation member 110 stops at the normal position. The normal position in this case may be a position that has been set immediately before the operation member 110 is retracted (a position adjusted in accordance with the driver's preference), or may be a position matching a body shape or the like of the driver who is seated in the driver's seat when the operation member 110 is deployed. Information such as the body shape of the driver may be detected as necessary by a sensor such as a camera, or may be derived from attribute information for each driver stored in a storage device in advance.

Thus, as in the case of the retracting movement, when the operation member 110 is deployed, the moving speed of the operation member 110 is changed to achieve both effects of securing the safety of the driver and moving the operation member 110 efficiently. Basically, as in the case of the retracting movement of the operation member 110, when the possibility of interference between the operation member 110 and the driver is low, the moving speed of the operation member 110 is increased, and when the possibility of interference between the operation member 110 and the driver is high, the moving speed of the operation member 110 is reduced.

For example, in the embodiment, in the deploying movement of the operation member 110 to the normal position, when the operation member 110 that has started to move toward the normal position reaches a predetermined position, that is, a second predetermined position, the control unit 190 of the steering system 100 controls the slide mechanism 170 to reduce the moving speed and controls the tilt mechanism 180 to move the operation member 110 upward. In the embodiment, the predetermined position is a position in the vicinity of the knee area 500a, for example, any position in the section A2 in FIG. 3.

That is, in the deploying movement of the operation member 110, when the operation member 110 moves rearward through the opening 405 and approaches the knee area 500a, the tilt mechanism 180 moves the operation member 110 upward. At this time, the operation member 110 reaches a position close to the driver. Thus, the control unit 190 reduces the moving speed of the operation member 110 moved by the slide mechanism 170. The moving speed at this time is, for example, approximately the second speed V2 (see FIG. 1). Then, after the operation member 110 has passed the knee area 500a, the tilt mechanism 180 moves the operation member 110 downward such that the operation member 110 is returned to the normal position. The moving speed at this time is also approximately the second speed V2. Thus, even if the operation member 110 contacts the driver, there is little possibility of causing substantial harm to the driver. Therefore, with the steering system 100 according to the embodiment, the safety of the driver is improved also in the deploying movement of the operation member 110.

Further, as described above, the deployment and the retraction of the operation member 110 may be performed in accordance with the instruction from the driver, or may be performed without the instruction from the driver. For example, a case is assumed in which the control unit 190 detects in advance that the autonomous driving level will be changed from the level that does not require monitoring by the driver to the level that requires monitoring by the driver, while the vehicle is being driven by the autonomous driving system. In this case, the control unit 190 may deploy the retracted operation member 110 to the normal position before the autonomous driving level is changed to the level that requires monitoring by the driver regardless of the instruction from the driver. In this case, the deploying movement of the operation member 110 is not started by the instruction from the driver, and thus the driver may not be prepared for the deployment of the operation member 110. In view of this, the steering system 100 according to the embodiment performs control to change the moving speed of the operation member 110 depending on whether the deploying movement of the operation member 110 is performed in accordance with the instruction from the driver. In other words, in the case where the operation member 110 that is retracted in the storage area 410 is deployed to the normal position, the control unit 190 moves the operation member 110 at a higher moving speed when the operation member 110 is deployed in accordance with the instruction from the driver than when the operation member 110 is deployed without the instruction from the driver.

Specifically, as shown in FIG. 9, the control unit 190 receives an instruction to deploy the operation member 110 (deployment instruction) (S100). When the deployment instruction is the instruction from the driver (Yes in S110), the control unit 190 controls the slide mechanism 170 to move the operation member 110 at a moving speed Va (S120). In other words, when the driver gives the deployment instruction to the control unit 190 by performing a predetermined operation such as an operation of pressing a button, the control unit 190 moves the operation member 110 at the moving speed Va. For example, the operation member 110 moves at the moving speed Va in a section from when the operation member 110 moves along the outer shape of the dashboard 400 and appears in front of the driver to when the operation member 110 reaches the knee area 500a.

When the received deployment instruction is not the instruction from the driver (No in S110), the control unit 190 controls the slide mechanism 170 to move the operation member 110 at a moving speed Vb (<Va) (S121). Cases in which the deployment instruction is not the instruction from the driver includes, in addition to the case in which the deployment instruction is an instruction from the autonomous driving system as described above, a case in which the control unit 190 detects via a sensor such as a camera that the driver has been seated on the driver's seat that had been vacant, for example. Like the moving speed Va, the moving speed Vb is the moving speed of the operation member 110 in a section from when the operation member 110 appears in front of the driver to when the operation member 110 reaches the knee area 500*a*.

As described above, in the deploying movement of the operation member 110, the control unit 190 slowly moves the operation member 110 closer to the driver when the deployment instruction is not the instruction from the driver. As a result, even if the driver does not recognize the deployment of the operation member 110, the driver is given a relatively long period of time to recognize the deployment of the operation member 110. This reduces the possibility of interference between the moving operation member 110 and the driver.

The steering system according to the disclosure has been described based on the embodiment and the modifications thereof. However, the disclosure is not limited to the above embodiment and the above modifications. Various changes and modifications may be made to the above embodiment or the above modifications, or constituent elements described above may be combined without departing from the scope of the disclosure.

For example, the operation member 110 need not be annular in shape as shown in FIG. 1. For example, the operation member 110 may have a C-shape or a U-shape in which one of the upper end portion and the lower end portion of the annular shape is omitted, or an H-shape in which both the upper end portion and the lower end portion of the annular shape are omitted. Even in this case, by rotating the operation member 110 around the rotation axis Ab, the operation member 110 can be inserted into the opening 405 having a smaller vertical width than that of the operation member 110.

In the embodiment, the slide mechanism 170 moves the operation member 110 in the front-rear direction by sliding the movable body 162 with respect to the base guide 161. Alternatively, the movable body 162 itself may have a telescopic structure that moves the operation member 110 forward and rearward. For example, the movable body 162 may include a first movable body that slides with respect to the base guide 161 and a second movable body that slides with respect to the first movable body and that is connected to the steering mechanism 101. In this case, since the movable body 162 can slide with respect to the base guide 161 and can expand and contract, the operation member 110 can be moved in a wider range in the front-rear direction. In this case, the slide mechanism 170 may include a first drive portion that moves the first movable body with respect to the base guide 161 and a second drive portion that moves the second movable body with respect to the first movable body. Thus, for example, the operation member 110 can be moved at a higher speed or with a larger driving force.

Further, the driver may be notified of the start of the retraction or the deployment of the operation member 110 before the start of the retraction or the deployment of the operation member 110 by one of or a combination of a voice, information displayed on a display, and blinking of a light emitting element. Thus, an alert regarding the movement of the operation member 110 is given to the driver, and accordingly, interference between the moving operation member 110 and the driver is restrained.

After receiving the notification of the retraction or the deployment of the operation member 110, the driver may notify the control unit 190 whether to allow or disallow the retraction or the deployment of the operation member 110 by a predetermined operation such as an operation of pressing a button. For example, even in the case where the retraction of the operation member 110 is allowed in a state in which the vehicle can be driven by the autonomous driving system, the retraction of the operation member 110 may be disallowed based on the intention of the driver. In this case, the driver operates the operation member 110 or the like to drive the vehicle.

The structure and the shape of the dashboard 400 need not necessarily be the structure and the shape shown in FIG. 3. For example, the opening 405 may be provided on a lower surface of the dashboard 400. That is, the operation member 110 may be stored in the storage area 410 inside the dashboard 400 through the opened portion of the lower surface of the dashboard 400. In this case, for example, a general dashboard having a structure with an opened lower surface can be provided on the vehicle together with the steering system 100. That is, even when the dashboard is not provided with an opening for storing (retracting) the operation member 110, it is possible to mount the steering system 100 on a vehicle including the dashboard.

Further, the steering system 100 may not include the airbag 200. That is, regardless of whether the steering system 100 is provided with the airbag 200 and the airbag housing 120, the operation member 110 can be deployed from the storage area 410 and retracted into the storage area 410 safely and efficiently.

In the embodiment, the rotation axis Ab around which the operation member 110 is rotated by the rotation mechanism 130 is located forward of the operation member 110 in FIG. 1, but the position of the rotation axis Ab of the operation member 110 is not limited to this. For example, the support member 115 connecting the rotation mechanism 130 and the operation member 110 may extend from the rotation mechanism 130 so as to be parallel to the width direction of the vehicle (the Y-axis direction in FIG. 1). In this case, the operation member 110 rotates around the rotation axis Ab that is located in the same position as the position of the operation member 110 in the front-rear direction. Thus, when the rotation axis Ab is located in the same position as, or in the vicinity of the position of the operation member 110 in the front-rear direction, the operation member 110 can be rotated around the rotation axis Ab within a relatively small spatial area.

Further, the steering system 100 may not include the rotation mechanism 130. That is, the retraction of the operation member 110 into the storage area 410 and the deployment of the operation member 110 from the storage area 410 may be performed by a combination of the movement in the front-rear direction caused by the slide mechanism 170 and the movement in the up-down direction by the tilt mechanism 180. The fact that the steering system 100 includes the rotation mechanism 130 is advantageous in view of improving the degree of freedom of the posture of the operation member 110. That is, since the steering system 100 includes the rotation mechanism 130, for example, the operation member 110 is easily moved along the outer shape of the dashboard 400, and the operation member 110 is easily inserted into the relatively small opening 405.

Further, the sections A1 to A6 shown in FIG. 3 are sections that are set for convenience in describing an example of the retracting movement of the operation member 110, and the moving speed or the posture or the like of the operation member 110 need not be changed clearly at start points or end points of these sections. The number and the width of the sections shown in FIG. 3 are also examples, and the number and the width of the sections are not limited to specific values.

The disclosure is useful as a steering system capable of expanding the space in front of the driver and improving the safety of the driver. The disclosure is applicable to, for example, a vehicle, such as an automobile, a bus, a truck, agricultural equipment, or construction equipment, which has wheels, a crawler, or the like and which can be manually driven and autonomously driven.

What is claimed is:

1. A steering system configured to steer a vehicle, the steering system comprising:
   an operation member configured to perform an operation;
   a first movement mechanism configured to move the operation member between a normal position at which the operation member is operated by a driver, and a storage area located forward of the normal position;
   a second movement mechanism configured to move the operation member to change a position of the operation member in an up-down direction of the vehicle; and
   a control unit configured to control the first movement mechanism and the second movement mechanism, wherein:
   the storage area is located inward of an opening of a vehicle member provided in front of a driver's seat in the vehicle; and
   the control unit is configured to control, to retract the operation member into the storage area, the first movement mechanism and the second movement mechanism to operate simultaneously to perform a forward movement of the operation member, which has reached a vicinity of the vehicle member, along an outer shape of the vehicle member.

2. The steering system according to claim 1, further comprising
   a rotation mechanism configured to rotate the operation member around a rotation axis extending in a width direction of the vehicle,
   wherein the control unit is configured to further control the rotation mechanism to move an upper end portion of the operation member along the outer shape of the vehicle member in the forward movement.

3. The steering system according to claim 2, wherein:
   a vertical width of the operation member is larger than a vertical width of the opening when the operation member is disposed along the opening and viewed from an opening direction in which the opening is opened; and
   the control unit is configured to control the first movement mechanism, the second movement mechanism, and the rotation mechanism to insert the operation member into the opening from a lower end portion of the operation member, the operation member being rotated such that the lower end portion of the operation member faces forward.

4. The steering system according to claim 1, wherein the control unit is configured to increase a moving speed at which the operation member is moved forward by the first movement mechanism after at least a part of the operation member has reached an inside of the storage area and a downward movement of the operation member by the second movement mechanism has been completed, to retract the operation member into the storage area.

5. The steering system according to claim 1, wherein the control unit is configured to control the second movement mechanism to move the operation member upward in the storage area when the operation member reaches a predetermined position in the storage area to retract the operation member into the storage area.

6. The steering system according to claim 1, wherein the control unit is configured to complete retraction of the operation member with a portion of the operation member contacting a surface defining the storage area or a member fixed in the storage area.

7. The steering system according to claim 1, wherein the control unit is configured to control the first movement mechanism to reduce a moving speed of the operation member and to control the second movement mechanism to move the operation member upward when the operation member that has started to move toward the normal position reaches a predetermined position, to deploy the operation member that is retracted in the storage area to the normal position.

8. The steering system according to claim 1, wherein the control unit is configured to move the operation member at a higher moving speed when the operation member that is retracted in the storage area is deployed to the normal position in accordance with an instruction from the driver than when the operation member that is retracted in the storage area is deployed to the normal position without the instruction from the driver.

9. A steering system configured to steer a vehicle, the steering system comprising:
   an operation member configured to perform an operation;
   a first movement mechanism configured to move the operation member between a normal position at which the operation member is operated by a driver, and a storage area located forward of the normal position;
   a second movement mechanism configured to move the operation member to change a position of the operation member in an up-down direction of the vehicle; and
   a control unit configured to control the first movement mechanism and the second movement mechanism, wherein:
   the storage area is located inward of an opening of a vehicle member provided in front of a driver's seat in the vehicle; and
   the control unit is configured to control, to retract the operation member into the storage area, the first movement mechanism and the second movement mechanism to perform a forward movement of the operation member, which has reached a vicinity of the vehicle member, along an outer shape of the vehicle member,
   wherein the control unit is configured to increase a moving speed at which the operation member is moved forward by the first movement mechanism after at least a part of the operation member has reached an inside of the storage area and a downward movement of the operation member by the second movement mechanism has been completed.

10. A steering system configured to steer a vehicle, the steering system comprising:
    a steering wheel;
    a slide mechanism including a first motor and a sliding support and configured to move the steering wheel between
       a normal position at which the steering wheel is operated by a driver, and
       a storage area located forward of the normal position;
    a tilt mechanism including a second motor and a pivot and configured to move the steering wheel to change a position of the steering wheel in an up-down direction of the vehicle; and
    a control unit configured to control the slide mechanism and the tilt mechanism, wherein:

the storage area is located inward of an opening of a vehicle member in front of a driver's seat in the vehicle; and the control unit is configured to control, to retract the steering wheel into the storage area, the slide mechanism and the tilt mechanism to operate simultaneously to perform a forward movement of the steering wheel, which has reached a vicinity of the vehicle member, along an outer shape of the vehicle member.

11. The steering system according to claim 10, further comprising a third motor configured to rotate the steering wheel around a rotation axis extending in a width direction of the vehicle, wherein the control unit is configured to further control the third motor to move an upper end portion of the steering wheel along the outer shape of the vehicle member in the forward movement.

12. The steering system according to claim 11, wherein:

a vertical width of the steering wheel is larger than a vertical width of the opening when the steering wheel is disposed along the opening and viewed from an opening direction in which the opening is opened; and the control unit is configured to control the slide mechanism, the tilt mechanism, and the third motor to insert the steering wheel into the opening from a lower end portion of the steering wheel, the steering wheel being rotated such that the lower end portion of the steering wheel faces forward.

13. The steering system according to claim 10, wherein the control unit is configured to increase a moving speed at which the steering wheel is moved forward by the slide mechanism after at least a part of the steering wheel has reached an inside of the storage area and a downward movement of the steering wheel by the tilt mechanism has been completed, to retract the steering wheel into the storage area.

14. The steering system according to claim 10, wherein the control unit is configured to control the tilt mechanism to move the steering wheel upward in the storage area when the steering wheel reaches a predetermined position in the storage area to retract the steering wheel into the storage area.

15. The steering system according to claim 10, wherein the control unit is configured to complete retraction of the steering wheel with a portion of the steering wheel contacting a surface defining the storage area or a member fixed in the storage area.

16. The steering system according to claim 10, wherein the control unit is configured to control the slide mechanism to reduce a moving speed of the steering wheel and to control the tilt mechanism to move the steering wheel upward when the steering wheel that has started to move toward the normal position reaches a predetermined position, to deploy the steering wheel that is retracted in the storage area to the normal position.

17. The steering system according to claim 10, wherein the control unit is configured to move the steering wheel at a higher moving speed when the steering wheel that is retracted in the storage area is deployed to the normal position in accordance with an instruction from the driver than when the steering wheel that is retracted in the storage area is deployed to the normal position without the instruction from the driver.

* * * * *